United States Patent
Shim (10) Patent No.: US 6,488,318 B1
(45) Date of Patent: Dec. 3, 2002

(54) PIPING JOINT AND INTEGRATED VALVE WITH IT

(75) Inventor: Jae Young Shim, Chokwang Yolip 103, 9-3, Shinwol 5-dong, Yangchon-gu, Seoul 158-095 (KR)

(73) Assignee: Jae Young Shim, Seoul (KR)

( * ) Notice: Subject to any disclaimer, the term of this patent is extended or adjusted under 35 U.S.C. 154(b) by 0 days.

(21) Appl. No.: 09/582,308

(22) PCT Filed: Dec. 23, 1997

(86) PCT No.: PCT/KR97/00276

§ 371 (c)(1),
(2), (4) Date: Aug. 21, 2000

(87) PCT Pub. No.: WO99/32821

PCT Pub. Date: Jul. 1, 1999

(51) Int. Cl.$^7$ ................................................. F16L 27/00
(52) U.S. Cl. ..................... 285/322; 285/385.7; 285/342; 285/353
(58) Field of Search ............................... 285/382.7, 342, 285/343, 353, 322

(56) References Cited

U.S. PATENT DOCUMENTS

| | | | | |
|---|---|---|---|---|
| 1,791,121 A | * | 2/1931 | Cowles ..................... | 285/382.7 |
| 1,983,840 A | * | 12/1934 | Dohner ..................... | 285/382.7 |
| 2,412,664 A | * | 12/1946 | Wolfram et al. ......... | 285/382.7 |
| 2,452,890 A | * | 11/1948 | Wolfram ................... | 285/382.7 |
| 2,466,526 A | * | 4/1949 | Wolfram ................... | 285/382.7 |
| 2,470,546 A | * | 5/1949 | Carlson .................... | 285/382.7 |
| 2,478,149 A | * | 8/1949 | Wolfram et al. ......... | 285/382.7 |
| 2,585,453 A | * | 2/1952 | Gallagher et al. ....... | 285/382.7 |
| 3,485,517 A | * | 12/1969 | Howe ....................... | 285/382.7 |
| 3,733,093 A | * | 5/1973 | Seiler ....................... | 285/382.7 |
| 4,062,572 A | * | 12/1977 | Davis ....................... | 285/382.7 |
| 4,630,851 A | | 12/1986 | Ogawa | |
| 4,798,404 A | * | 1/1989 | Iyanicki ................... | 285/382.7 |

FOREIGN PATENT DOCUMENTS

| | | |
|---|---|---|
| FR | 2204773 | 5/1974 |
| GB | 1474850 | 5/1977 |

* cited by examiner

*Primary Examiner*—Eric K. Nicholson (57) ABSTRACT

The present invention provides a piping joint and integrated valve with the piping joint, which improve airtight and watertight, maintain connection firm, and keep constant quality regardless repeated user. In connecting part (110, 120) of the joint body (100), the first holes (112, 113), the second packing holes (114, 124) where the first packing rings (170, 180) are inserted, the third holes (116, 126) with a female threaded part inside conjoining the second packing rings (150, 160) and bushes (130, 140), having three holes formed three phases outward on the concentric circle. The first packing rings (170, 180) are made of silicon or Teflon® that is flexible and sustainable against heat. One side of said second packing rings (150, 160) contact the first packing rings (170, 180), and ground the contact parts (152, 162) stoppers (154, 164) are placed to prevent the second packing rings (150, 160) from inserting too deeply into inside of the connecting parts (110, 120) of the joint body (100) and the other sides are tapered down in a certain angle to contact the slant (137, 147) of edges or bushes (130, 140), and the tapered parts (156, 166) are equipped with projections (158, 168) inside to hold pipes (P1, P2) firm.

8 Claims, 10 Drawing Sheets

PIPING JOINT AND INTEGRATED VALVE WITH IT

TECHNICAL FIELD AND BACKGROUND ART

The present invention is a piping joint and an integrated valve with it. The invention improves watertightness of connecting parts, maintains the joint firm and keeps its quality regardless repeated uses, thus it is convenient for maintenance.

Figure 16:
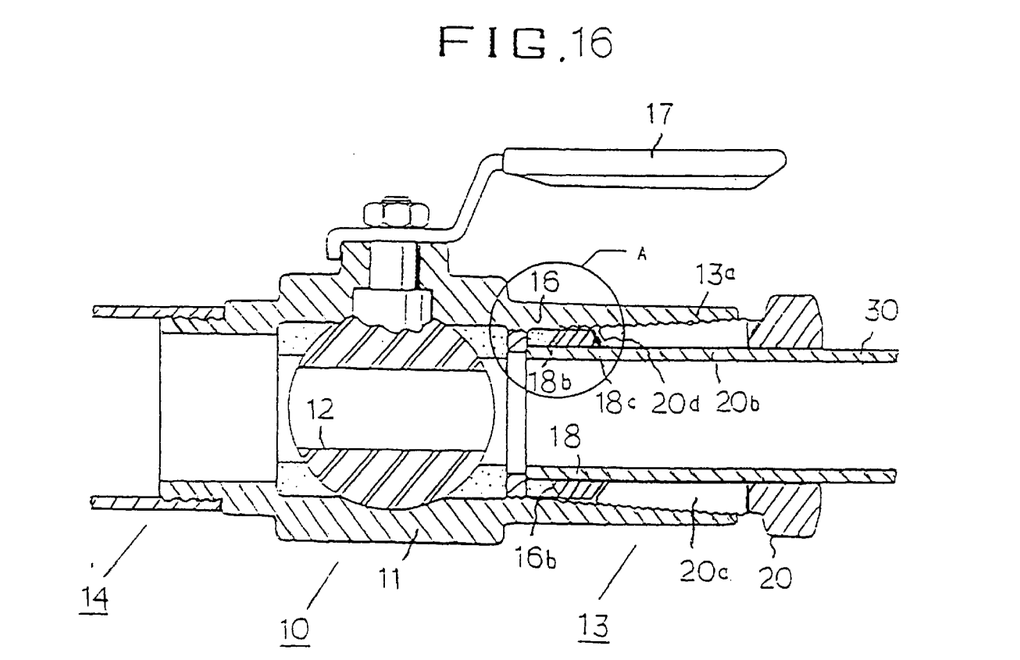
FIG. 16 is a cross section of an former valve equipped with pipes-connecting hole.
Figure 17A:
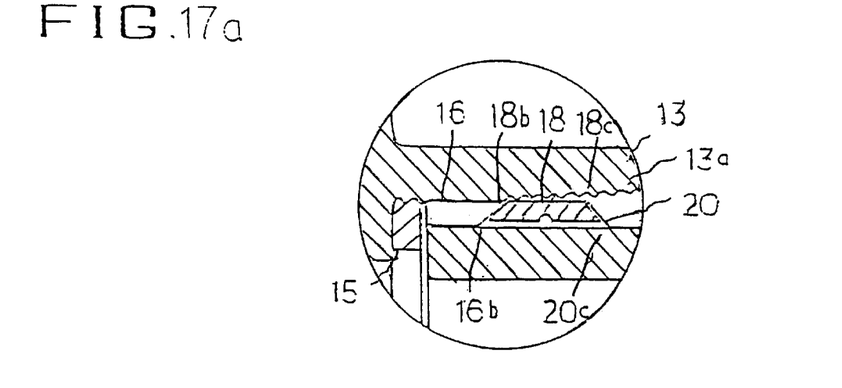
FIG. 17a is an enlarged cross section showing that the first packing ring and the second packing ring of a former valve with pipes-connecting hole are inserted and assembled in a valve.
Figure 17B:
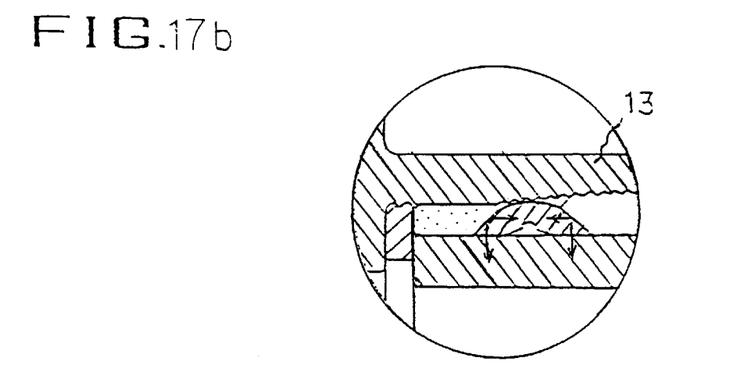
FIG. 17b is an enlarged cross section showing g that the second packing ring transformed from FIG. 17a maintain airtightness.
Figure 18:
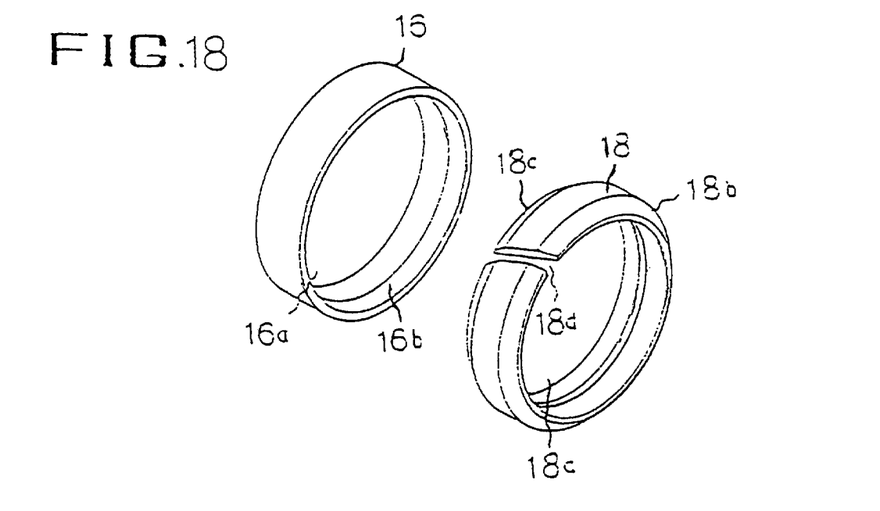
FIG. 18 is a perspective view of former first packing ring and second packing ring.

Prior art related to the present invention is "Valve with a pipe-connecting part" published in Korean Utility Model Specification No. 97-1671. Said prior art was invented by the current inventor and its technical gist is that, as shown in FIGS. 16 and 18, a valve consists of a ball 11 operated by a lever 17 to pass through or to block an entrance and an exit of the valve, tapered screw part 13a equipped along circumferential side inside of pipe-connecting part 13 in said valve, screw part 20a formed on circumferential side to correspond to said screw part 13a, an open hole 20b through its axis, a bush 20 with a slant 20d on its longitudinal section, the first packing ring 16 with a slant 16b on the side; the second packing ring 18 which carries split on edge in part and involves slants 18b, 18c on both sides to contact a slant 20d of a bush 20 and a slant of the first packing ring 16. Thus, in the prior art as said bush spins toward inside of the valve, a slant formed at the edge of the bush 20 pushes a slant 18c of the second packing ring 18 as shown in FIG. 17 so that an open hole 18a of the second packing ring 18 is narrowed and finishes sealing.

But several disadvantages found in said prior art are as follows. First, to form tapered screw part 13a around the inside of the pipe-connecting part 13 results in difficulties in fine manufacturing and low precision of products. Thus, increased errors in manufacturing result in high inferiority rate in products and piping using this product may result in inferior construction Second, the screw part 13a is formed inside said pipe-connecting part 13 through whole length and the first packing ring 16 and the second packing ring are inserted into screw part 13a. Therefore, it is inconvenient for maintenance because it is difficult to take them apart when repair needed.

Third, in adjusting the proper tightening power to the bush 20, it is hard to detect required certain level of tightening power from outside. This results in disadvantages that, when tightening power is too strong, damage(s) can occur on the first packing ring 16, the second packing ring 18, screw part 13a in pipe-connecting part 13, and screw part 20a in the bush 20 and, when tightening power is weak, sealing condition gets bad.

With the invention, the first packing rings are placed in the second holes of the connecting parts, and insertion of bushes increases thickness of the pushed second packing rings. Consequently, airtight and watertight between pipes and a joint body can be maintained. Connection can be maintained firm by that the second packing rings hold pipes tight. Thus, the invention can be applied to piping for fluid with high pressure. Elevated stoppers formed at the second packing rings are caught by stoppers formed at connecting parts, thus this prevents the first packing rings from excessive transformation and its operator would not waste excessive energy in piping by detecting the connection condition easily from the outside. Repeated uses are possible to each components, thus this effects that saves budget in maintenance.

DISCLOSURE OF INVENTION

The purpose of the invention designed to solve problems of said prior art is to provide a piping joint and a valve controlling fluid flow, in which simple joint tools can conjoin pipes without screws or extra flange coupling processes, in piping for heating, water service, hygiene, and industry. With the invention, first, pipe's watertightness is improved, second, connection can be maintained firm, third, tightening level can be detected from the outside so that a proper level can be obtained, and fourth, possible repeated use ease its maintenance.

To achieve the purposes, the present invention provides a joint body comprising connecting part(s) on one side, both sides, or three places where the end of raw pipe is inserted, a bush screwed inside the connecting part in the joint body, the first packing ring inserted at the edge of said pipe, and the second packing ring inserted at the edge of the first packing ring. The connecting part of the joint body comprises the first hole where a pipe is inserted, the second hole where the first packing ring connected with the edge of the pipe is inserted, and the third hold being equipped with a female thread connecting the second packing ring and the bush. The three holes form three phases outward on the concentric circle. Said first packing ring, which is made of silicon or Teflon that is flexible an sustainable against heat, is formed as short cylindrical figure with a right angle cutting end on both sides. The one side of said second packing ring is connected to the first packing ring. And around the contact part a stopper between the second hold and the third hole is placed to prevent the second packing ring from inserting too deeply into inside of the connecting part. The other side of the second packing ring is tapered down in a certain angle to contact a slant of bush's edge and the tapered part is equipped with projections inside to hold pipes firm and to prevent said pipes from secession.

Furthermore, a male thread equipped in said bush conjoins a female thread in the third hole at the joint body's connecting part. The male thread is equipped toward lengthwise with several slits which help a male thread stick a female thread when screwed.

BEST MODES FOR CARRYING OUT THE INVENTION

Figure 1:
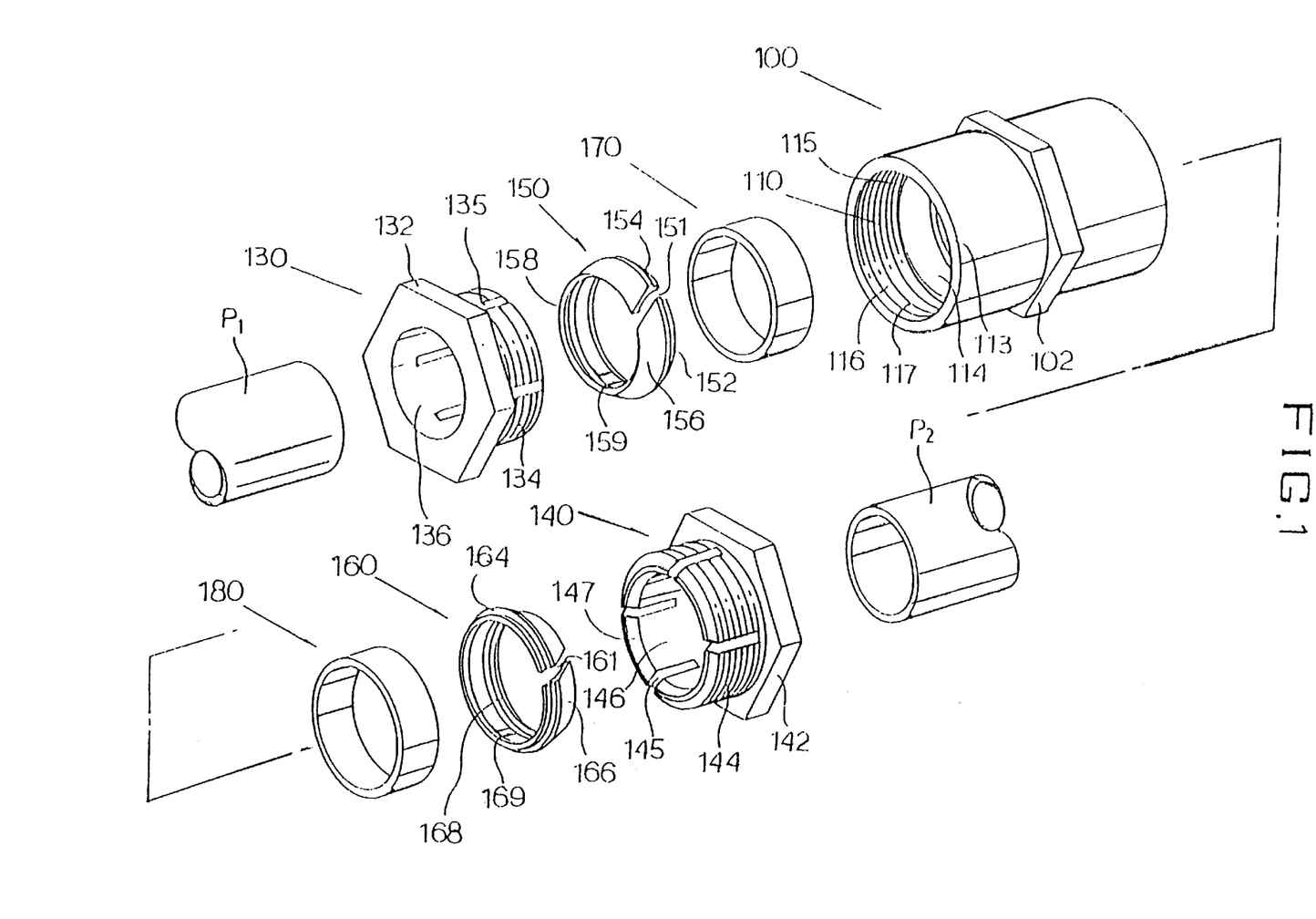
FIG. 1 is an disjoined perspective view of a union joint describing the first embodiment.
Figure 2:
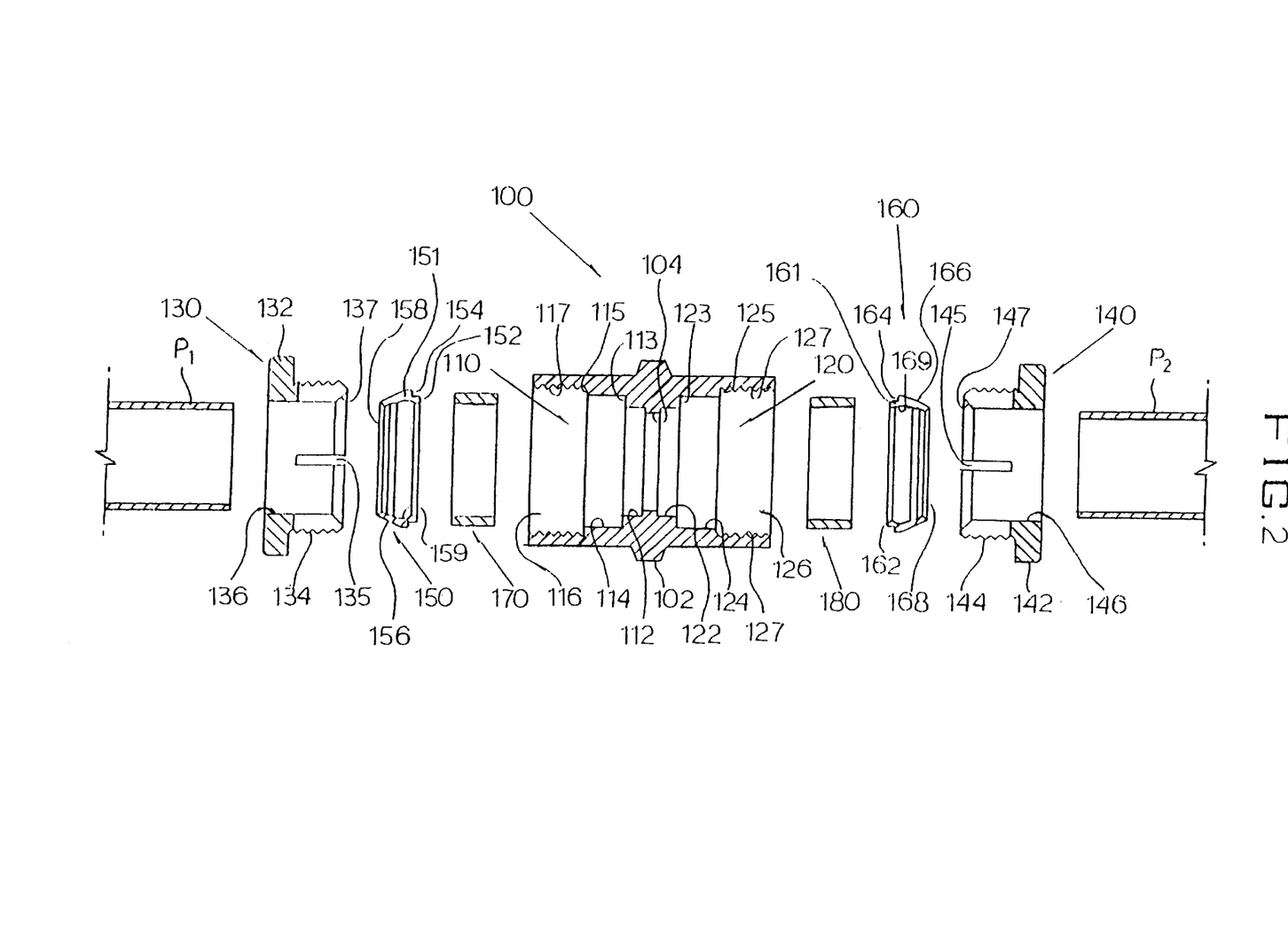
FIG. 2 is an disjoined cross section of a union joint describing the first embodiment.
Figure 3:
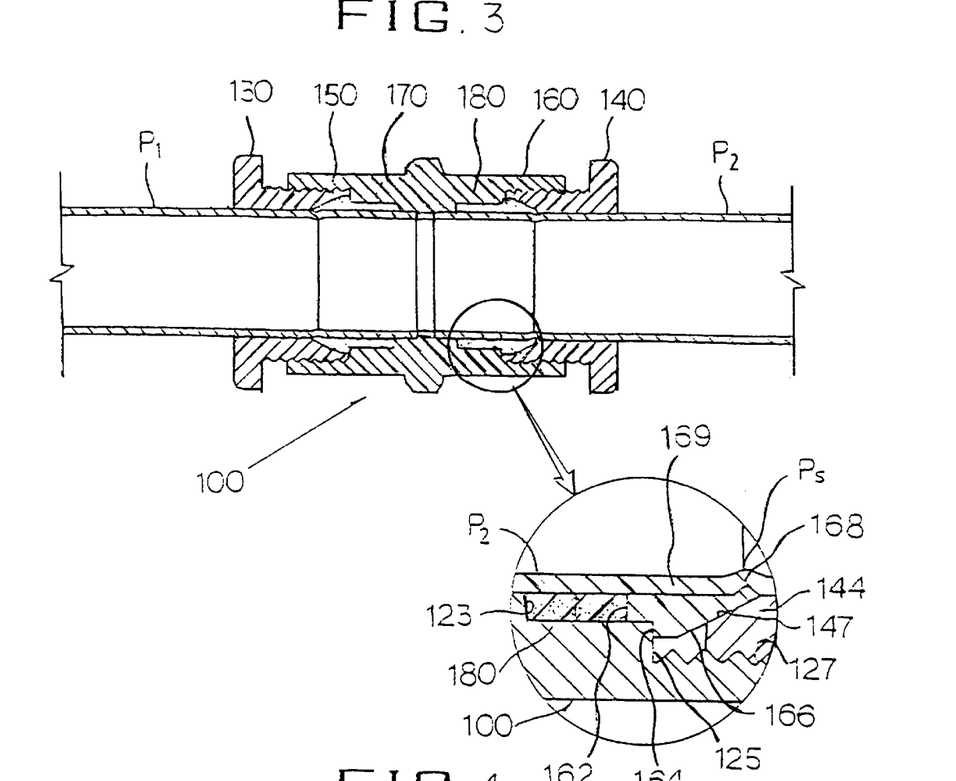
FIG. 3 is an assembly cross section of a union joint describing the first embodiment.

The first embodiment is shown in FIG. 1 through 3. The first embodiment is an union joint to connect two pipes in series in which connecting parts 110, 120 are formed on both sides of the joint body symmetrically and pipes P1, P2, bushes 130, 140, the second packing rings 150, 160, and the first packing rings 170, 180 are joined in order to the connecting parts 110, 120.

Hexagonal head Part 102 is formed on circumference in the middle of the outer surface of the joint body 100 and as same sized hexagonal head parts 132, 142 as said hexagonal head part is formed on bushes 130, 140 working as one pair of spanners in combining and separating. As shown in FIG. 2, inner constitution of the joint body 100 can be detected and connecting parts 110, 120 on both sides are penetrated so that a fluid can move to either directions.

Said two connecting parts 110, 120 have identical constitution. The first holes 112, 122 located in the center, the second holes 114, 124 which are a little bit larger than the first holes 112, 122, and the third holes 116, 126 are formed three phases from inside to outward in order. The ends of pipes P1, P2 are inserted into the first holes 112, 122 which are formed as same size as the pipe's circumference and on the circumference around the middle of the pipe, a center stopper 104 which controls depth of inserting pipes P1, P2 can be formed. Said second holes 114, 124 where the first packing rings 170, 180 are inserted are formed a little bit smaller than the first packing rings 170, 180.

Said third holes 116, 126 are where the second packing rings 150, 160 and bushes 130, 140. Female threads 117, 127 are placed inside the third holes 116, 126 to be conjoined with male threads 134, 144 of bushes 130, 140.

The first stopper 113, 123 are formed between the first holes 112, 122 and the second holes 114, 124 so that the ends of the first packing ring 170, 180 are stopped and stuck. The second stopper 11s, 125 are formed between the second holes 114, 124 and the third holes 116, 126 so that the ends of the second packing rings 150, 160 are stopped and stuck.

The bushes 130, 140 comprise hexagonal head parts 132, 142 and male threads 134, 144 formed on one side of the hexagonal head parts. Penetrating holes 136, 146 where pipes P1, P2 are inserted are formed inside of the hexagonal head parts 132, 142 and male threads Said male threads 134, 144 are equipped with plural slits 135, 145 so that diameter of male threads is flexible. Tapered and inclined parts 137, 147 are formed at the ends of the male threads 134, 144 to adhere to one side of said second packing rings 150, 160.

Figure 4:
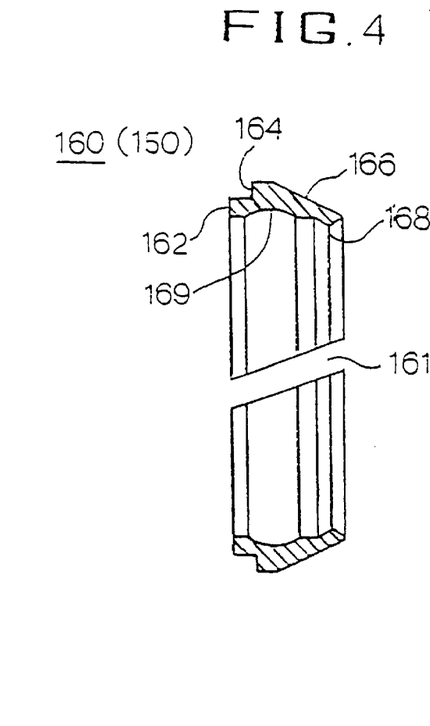
FIG. 4 is an enlarged cross section of the second packing ring used in a piping joint.

FIG. 4 is a enlarged cross section of the second packing rings 150, 160 of the invention. The second packing rings 150, 160 have connecting parts 152, 162 on one side, which contact said first packing rings 170, 180. On outer surface of the connecting parts 152, 162 elevated stopper 154, 164 are formed to stop at the second stoppers 115, 125 at the ends of the third holes 116, 126 to prevent the second packing rings 150, 160 from being inserted too deeply toward inside of the connecting parts 110, 120 of joint body. And on the other sides of the second packing rings tapered parts are formed to contact inclined parts 137, 147 of inside of the edges of the male threads 134, 144 of bushes 130, 140. Moreover, in the second packing rings 150, 160, projections 158, 168 are formed on circumference of inner surface of tapered parts 156, 166 to hold pipes, P1, P2. Of the second packing rings 150, 160, the contact parts 159, 169 with a certain radius of curvature are formed inside so that improves contact condition of outer surface of the pipes P1, P2 when conjoined with the second packing rings.

In addition, slightly inclined slits 151, 161 in one side in direction of length are formed on the second packing rings 150, 160, which enable the diameter to shrink. Various materials can be used for manufacturing joint body 100, bushes 130, 140, and the second packing rings 150, 160 depending the uses, and the first packing rings 170, 180 can be manufactured with silicone, Teflon or rubber materials, and for piping transporting high temperature fluid thermostable material can be used.

The process combining two pipes in series using an union joint of the first embodiment of the invention is described below. First, bushes 130, 140 and the second packing rings 150, 160 are put in pipes P1, P2 in order, and the first packing rings 170, 180 are inserted into the edges of the pipes P1, P2.

Then, a union joint body is placed between the pipes P1, P2 and pipes P1, P2 are inserted into the connecting parts 110, 120 on both sides of the joint body then, the first packing rings 170, 180 on the ends of the pipes P1, P2 are inserted into the first holes 112, 129 placed inside of the each connecting parts 110, 120.

At this point, when bushes 130, 140 are rotated holding the joint body 100 not to rotate, male threads 134, 144 of bushes 130, 140 are screwed at connecting parts 110, 120 and inserted inward. At the same time, the second packing rings 150, 160 inserted before bushes 130, 140 are placed inside of the third holes 116, 126 of the connecting parts 110, 120. The first packing rings 170, 180 at the first packing rings 117, I are under pressure with continuous rotating bushes 130, 140. The packing rings 170, 180 are shrunk in direction of length but their thickness is increased. This effects that a gap between outside of the pipes P1, P2 and the first holes 112, 177 is filled up then, airtight an kept.

On the contrary that the second packing rings 150, 160 are shrunk, male threads 134, 144 of bushes 130, 140 are inserted along with tapered parts 156, 166 of the second packing rings 150, 160, then, the diameter of male threads is expanded, so they tightly fits female threads 117, 127 formed at the third holes 116, 126.

When bushes 130, 140 are fastened tight enough, thickness of the first packing rings 170, 180 are increased gradually but elevated stoppers 154, 164 formed on one side of the second packing rings 150, 160 are caught by the second stoppers 115, 125 at the connecting parts 110, 120. Thus, this prevents the first packing rings 170, 180 from excessive transformation and insertion, and the operator would detect the condition easily and can adjust the tightness properly, and does not need to waste energy and efforts.

In case of taking them apart, the same process need to be done in contrary order. At that time, if the first rings 170, 180 are damaged, they can be replaced with new ones, and the second packing rings 150, 160 are separated easily with expanded diameter by self restoration power.

MODES FOR CARRYING OUT THE INVENTION

Figure 5:
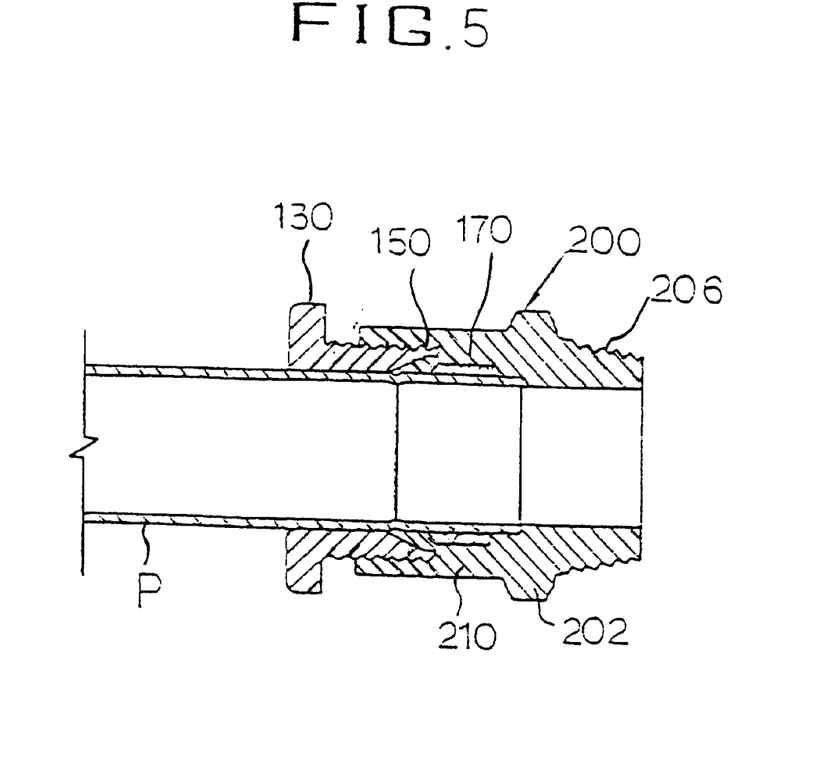
FIG. 5 is an assembly cross section of a male thread typed joint describing the second embodiment.
Figure 6:
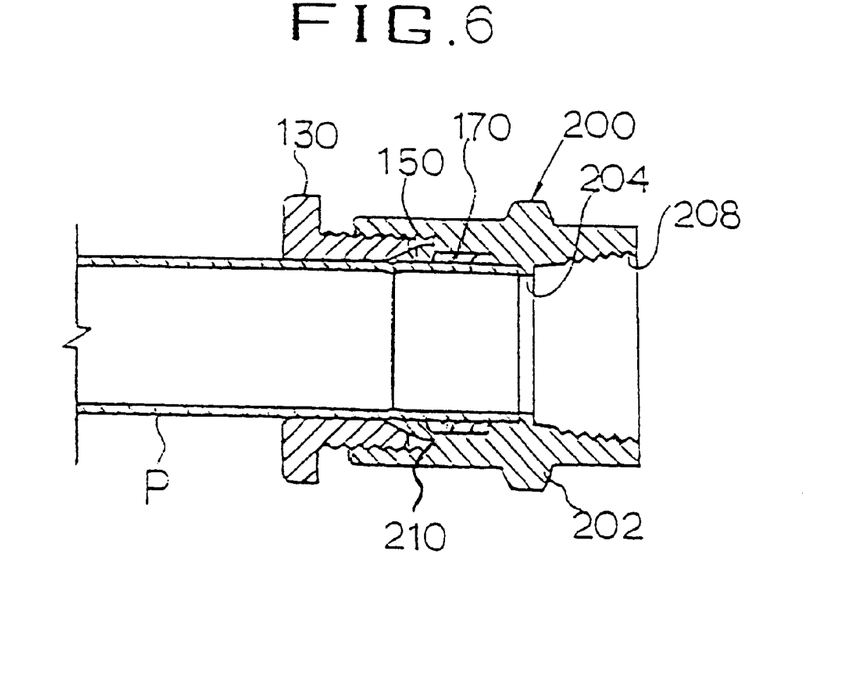
FIG. 6 is an assembly cross section of a female thread typed joint describing the third embodiment.

FIG. 5 describes the second embodiment of the invention and the FIG. 6 describes the third embodiment of the invention. In each these embodiments, a male thread part 206 and a female thread part 208, which are conjoined in one on the side of a joint body 200, can be combined with material other than pipes, for example, faucet of tithe fluid tank by connecting the joint body 200 directly and a pipe P can be conjoined with the other side of the joint body's connecting part 210.

Figure 7:
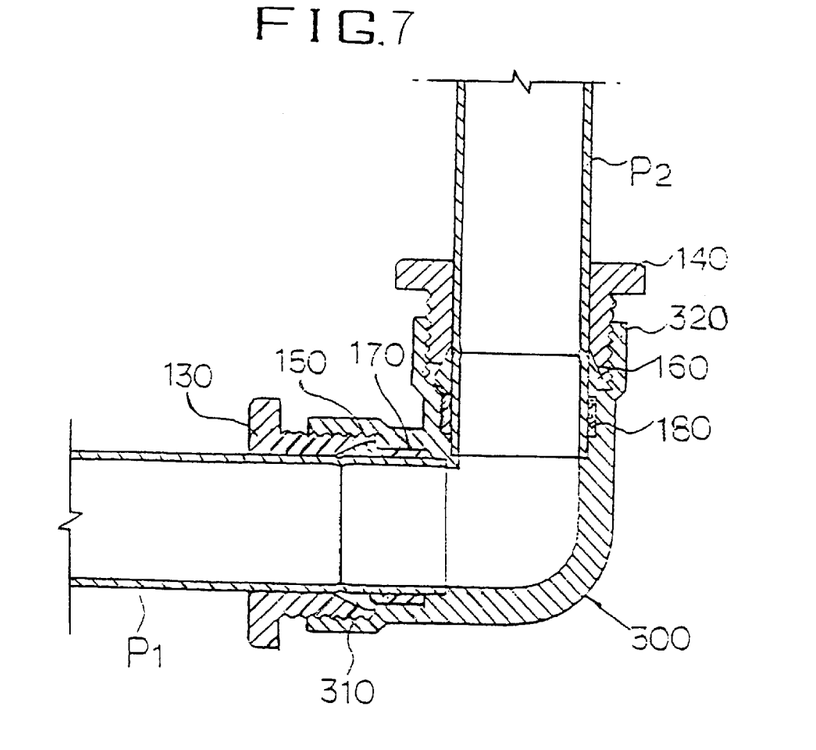
FIG. 7 is a cross section of an elbow joint describing the fourth embodiment.

For identical components in the attached drawings, identical codes are used as far as possible and redundant description is omitted for convenience. The fourth embodiment described in FIG. 7 is a elbow joint. Connecting parts 10, 320 as same as shown in the first embodiment are formed on both sides of joint body 300 which is bent at an angle of 45° or 90° and pipes P1, P2., bushes 130, 140, the first packing rings 170, 180, and the second packing rings 150, 160 are inserted in order.

In the fourth embodiment, connecting parts 310, 320 are formed on both sides of elbow. The invention, however, is not restricted to this and a female thread can be formed on the side of the elbow and other materials other than pipes can be conjoined as shown in third embodiment.

Figure 8:
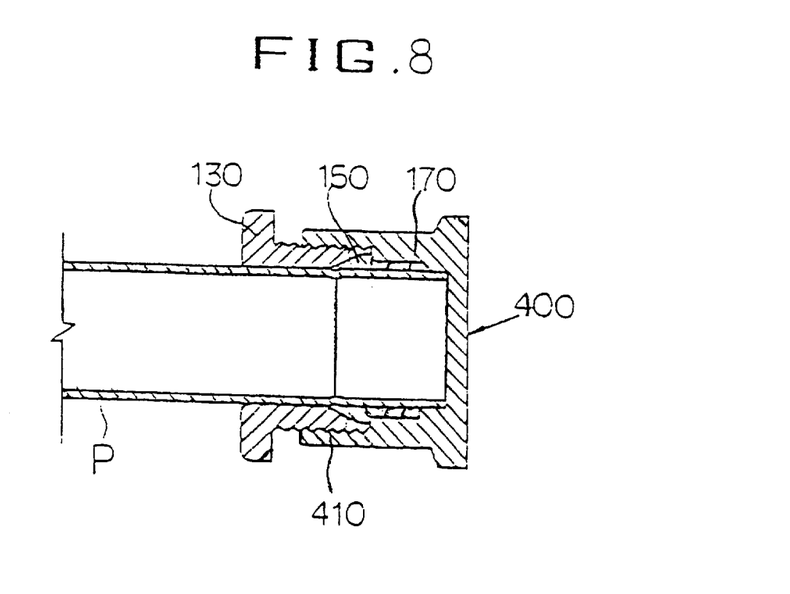
FIG. 8 is a cross section of a cap joint describing the fifth embodiment.

The fifth embodiment described in FIG. 8 is a cap joint to block the one end of a pipe F. Connecting part 410 as shown in the first embodiment is formed on one side of closed-end joint body 400, and an end of a pipe P is conjoined to it, so that blocks the flowing of fluid completely.

Figure 9:
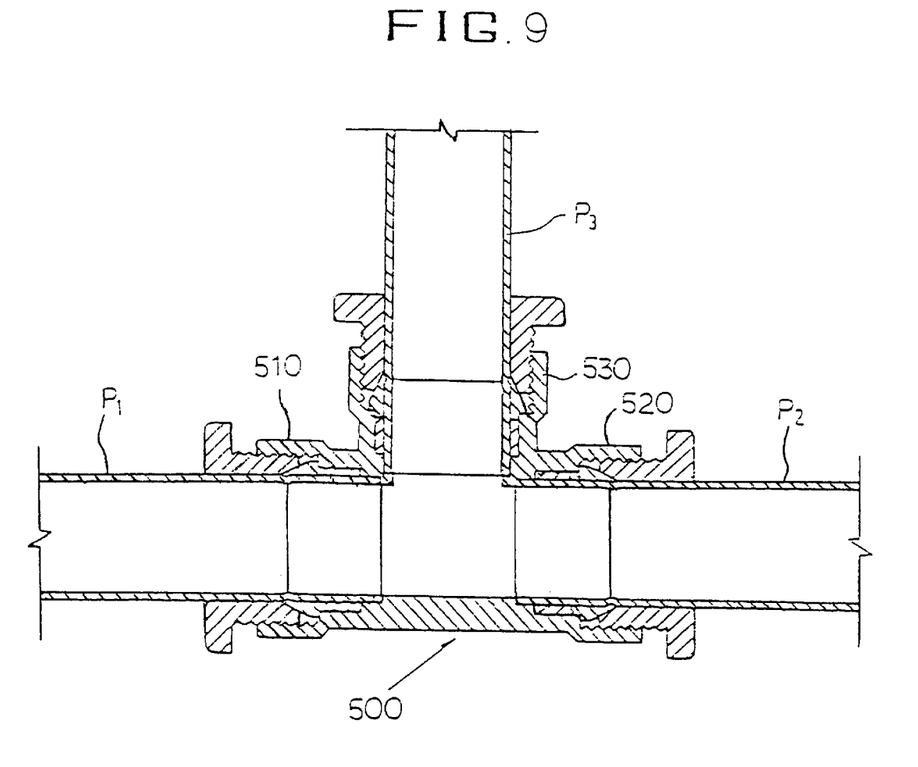
FIG. 9 is a cross section of a T joint describing the sixth embodiment.

The sixth embodiment described in FIG. 9 is a T joint which have three connecting parts 510, 520, 530 to conjoin three same sized pipes P1, P1, P3 into one joint body 500.

Figure 10:
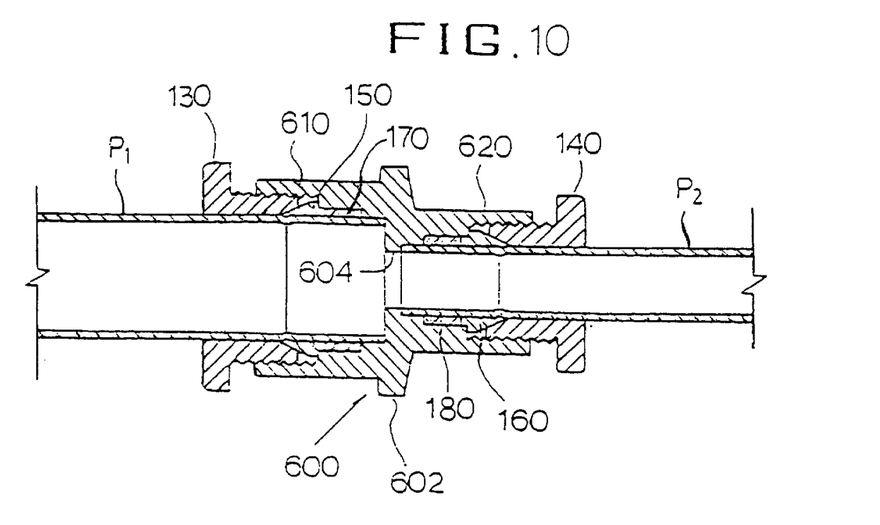
FIG. 10 is a cross section of a joint with reduced diameter describing the seventh embodiment.

The seventh embodiment described in FIG. 10 is a transformation of said first embodiment This joint have two different sized connecting parts 610, 620 on both sides of the joint body to connect two different sized pipes P1, P2 in series.

Figure 11:
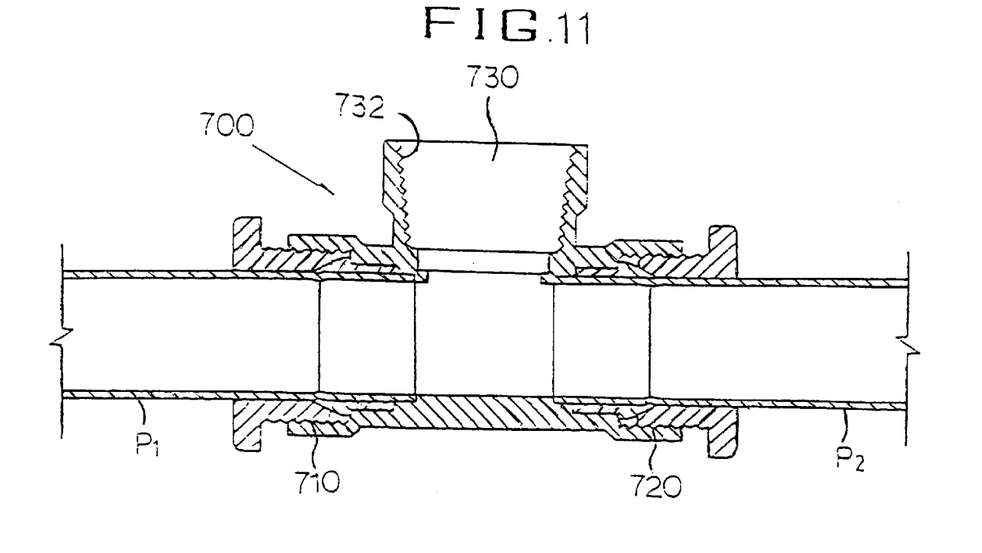
FIG. 11 is a cross section of a T joint describing the transformed sixth embodiment.
Figure 12:
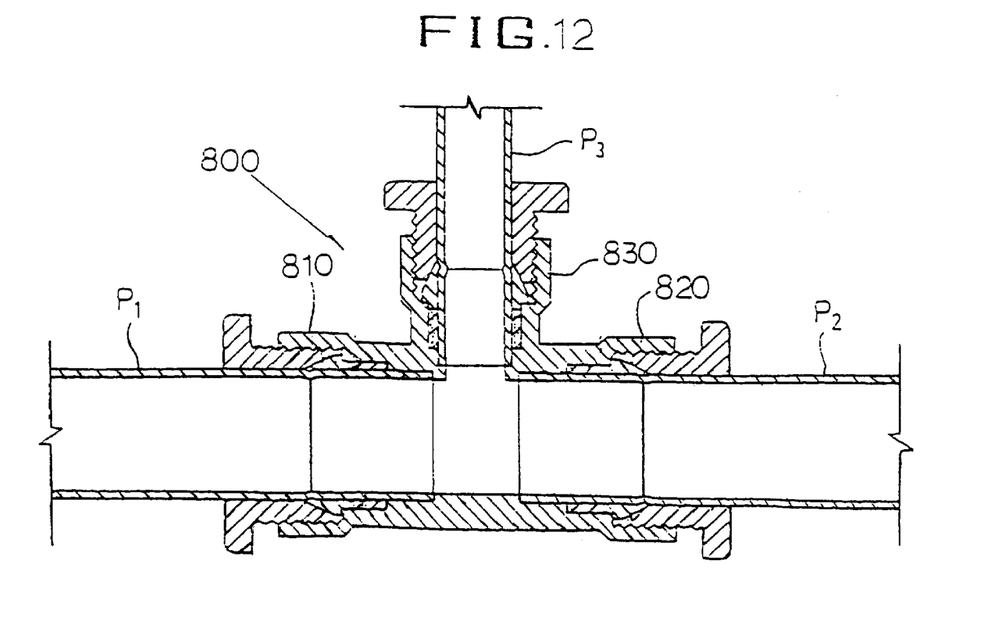
FIG. 12 is a cross section of a T joint describing another transformed sixth embodiment.
Figure 13:
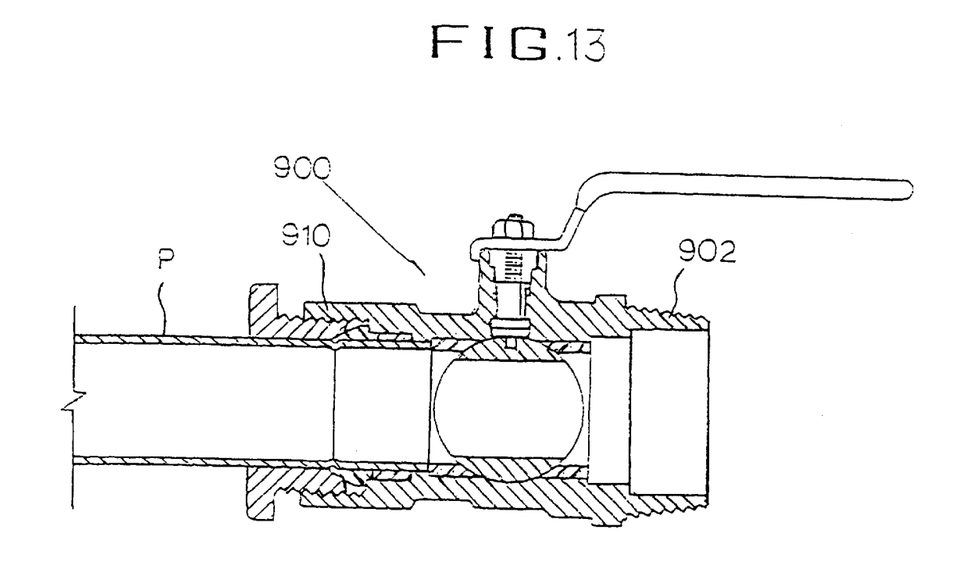
FIG. 13 is a cross section of a valve integrated with a male thread type joint describing the second embodiment.
Figure 14:
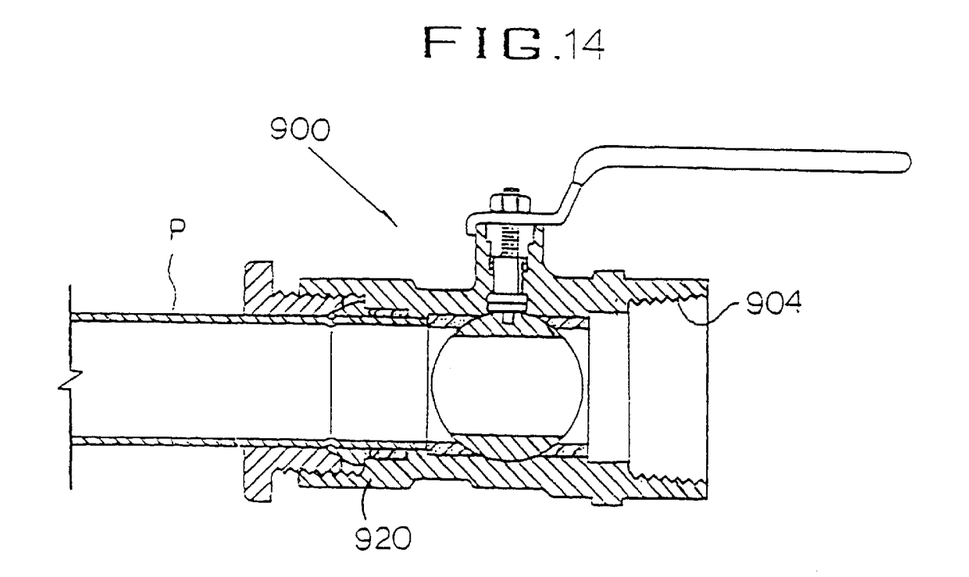
FIG. 14 is a cross section of a valve integrated with a female thread type joint describing, the third embodiment.

Transformed embodiment of the sixth embodiment described in FIG. 11 is T joint. Connecting parts 710, 770 are formed on both sides of the joint body 700, and contact part 730 with a female thread 732 is formed in the middle, and materials other than pipes are screwed directly into the contact part 730 as shown in the third embodiment. Another transformed embodiment of the sixth embodiment described in FIG. FIG. 12 is T joint. Identical sized connecting parts 810, 820 are formed on both sides of the joint and the connecting parts 810, 820 make a right angle with a middle connecting part 830 which is formed in different size, so a pipe with a narrower diameter can branch off. FIG. 13 and 14 describes a valve, as same as shown in second embodiment and the third embodiment, which is formed with a male thread joint or a female thread joint in one body, and on one end of the valve body 900 a male thread joint 902 or a female thread joint 904 is formed and on the other end the connecting parts 910, 920 are formed to conjoin with a pipe P.

Figure 15:
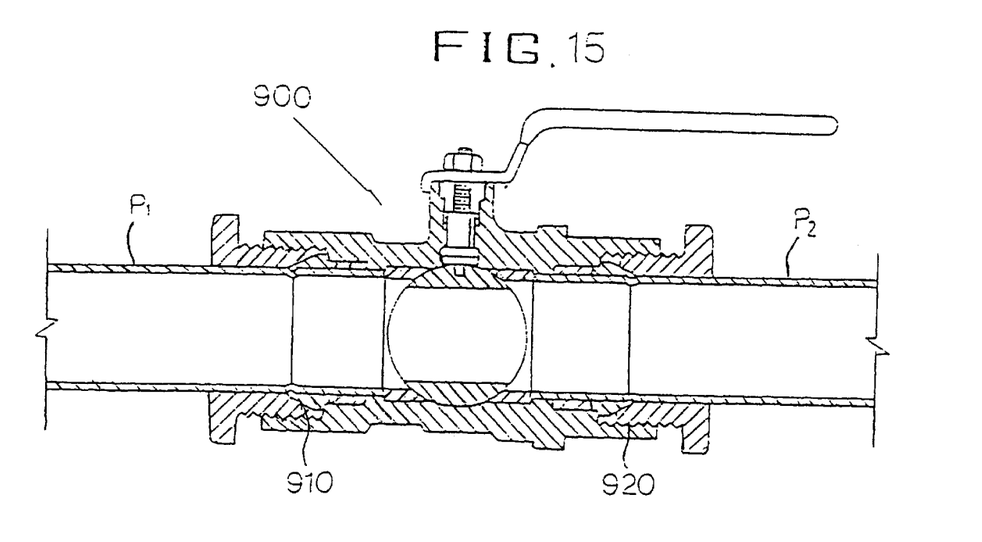
FIG. 15 is a cross section of a valve which is similar to an union joint in its constitution describing the first embodiment.

FIG. 15 describes a valve which has a similar constitution with a union joint described in the first embodiment. In the embodiment, the connecting parts 910, 920 of which constitution is as identical as shown in the first embodiment are formed on both sides of the valve body 900, and the valve can be placed between two pipes P1, P2.

INDUSTRIAL APPLICATION

The present invention provides a piping joint and a valve controlling fluid flow, in which simple joint tools can conjoin pipes without screws or extra flange coupling processes, in piping for heating, water service, hygiene, and industry. With the invention, first, pipe's watertightness is improved, second, connection can be maintained firm, third, tightening level can be detected from the outside so that a proper level can be obtained, and fourth, possible repeated use ease its maintenance.

What is claimed is:

1. A piping joint comprising a joint body having a connecting portion where a pipe end is inserted, comprising a bush screwed inside the connecting portion and a first packing ring inserted therein, characterized in that:

the connecting portion includes a first cylindrical opening having a first diameter where the pipe end is inserted, a second cylindrical opening having a second diameter where the first packing ring is inserted and a third cylindrical opening of third diameter, the first diameter being greater than the second diameter and the second diameter being greater than the third diameter;

a second packing ring is inserted in the third opening, the third opening has a female thread, and a bush is inserted in the third opening between the female thread and the second packing ring for compressing the second packing ring;

there is a wall between the second and third openings, one end of the second packing ring contacts the first packing ring, and the first packing ring includes an abutment which presses against the wall to prevent the second packing ring from overinsertion;

the bush has a first slanted edge, and the second packing ring has a tapered portion, one side of which contacts the slanted edge of the bush and the other side of which has a projection for compressing the pipe, and the bush has a male thread and several slots along its length to facilitate connection with the connecting portion.

2. The piping joint of claim 1 wherein the second packing ring includes inclined slits which permit the second packing rings to compress.

3. The piping joining of claim 1 wherein said joint body comprises an elbow.

4. The piping joint of claim 1 wherein one end of said joint body is closed.

5. The piping joint of claim 1 wherein said joint body has two sides and has connecting portions on both sides wherein the diameters of said respective connecting portions is different.

6. The piping joint of claim 1 wherein said joint body is a T joint.

7. The piping joint of claim 5 wherein the piping joint has connecting portions which are of different diameters.

8. The piping joint of claim 1 wherein the piping joint has connecting portions on both sides and wherein a male or female threaded part is formed on one of said sides.

* * * * *